United States Patent
Seemann

(10) Patent No.: US 12,506,593 B2
(45) Date of Patent: Dec. 23, 2025

(54) METHOD AND ARRANGEMENT FOR THE SECURE TRANSMISSION OF A MESSAGE FROM A TRANSMITTER TO A RECEIVER

(71) Applicant: SIEMENS MOBILITY GMBH, Munich (DE)

(72) Inventor: Markus Seemann, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 523 days.

(21) Appl. No.: 16/977,164

(22) PCT Filed: Feb. 4, 2019

(86) PCT No.: PCT/EP2019/052586
§ 371 (c)(1),
(2) Date: Sep. 1, 2020

(87) PCT Pub. No.: WO2019/166182
PCT Pub. Date: Sep. 6, 2019

(65) Prior Publication Data
US 2021/0067327 A1    Mar. 4, 2021

(30) Foreign Application Priority Data
Mar. 1, 2018   (DE) .......................... 102018203072.3

(51) Int. Cl.
*H04L 9/32* (2006.01)
*H04L 9/08* (2006.01)
*H04L 9/30* (2006.01)

(52) U.S. Cl.
CPC ............ *H04L 9/0825* (2013.01); *H04L 9/304* (2013.01); *H04L 9/3242* (2013.01);
(Continued)

(58) Field of Classification Search
CPC ..... H04L 9/0825; H04L 9/304; H04L 9/3242; H04L 2209/34; H04L 2209/72; H04L 2209/84
See application file for complete search history.

(56) References Cited

U.S. PATENT DOCUMENTS 5,673,252 A * 9/1997 Johnson ................. G01D 4/004
370/349
5,943,426 A * 8/1999 Frith ....................... H04L 69/04
713/153
(Continued)

FOREIGN PATENT DOCUMENTS

CN    1482832 A    3/2004
CN  101990748 A    3/2011
(Continued)

OTHER PUBLICATIONS

Bock et al., Towards an IT Security Protection Profile for Safety-Related Communication in Railway Automation, Springer, 2012.*
(Continued)

*Primary Examiner* — David Garcia Cervetti
(74) *Attorney, Agent, or Firm* — Laurence A. Greenberg; Werner H. Stemer; Ralph E. Locher

(57) ABSTRACT

A method transmits a message from a transmitter to a receiver. A telegram generated by the transmitter and contains the message and check data, is transferred to a transmitter-side access protection device. The transmitter-side access protection device modifies the telegram and then transmits it to a receiver-side access protection device. The transmitter-side access protection device modifies the telegram by encrypting the check data, which contains a security code formed with the message by the transmitter, using a secret key forming coded data. The message remains unencrypted in the telegram. The receiver-side access protection device processes the modified telegram and passes the
(Continued)

processed telegram to the receiver. The receiver-side access protection device forms the processed telegram by decrypting the coded data, and the receiver verifies the processed telegram using the message contained therein and the check data contained therein and rejects the message if the check data does not correlate.

14 Claims, 6 Drawing Sheets

(52) U.S. Cl.
CPC ...... *H04L 2209/34* (2013.01); *H04L 2209/72* (2013.01); *H04L 2209/84* (2013.01)

(56) References Cited

U.S. PATENT DOCUMENTS

| | | | | |
|---|---|---|---|---|
| 6,496,930 | B1* | 12/2002 | Ono | H04L 63/123 713/168 |
| 7,242,766 | B1* | 7/2007 | Lyle | H04L 9/3271 380/2 |
| 8,555,057 | B2* | 10/2013 | Raftelis | H04L 9/3236 713/168 |
| 8,938,804 | B2* | 1/2015 | Vaidyanathan | H04L 63/1425 726/13 |
| 11,265,170 | B2* | 3/2022 | Takemori | G07C 5/085 |
| 2002/0019933 | A1* | 2/2002 | Friedman | H04L 69/16 713/160 |
| 2003/0078058 | A1* | 4/2003 | Vatanen | H04L 9/3247 455/411 |
| 2005/0005093 | A1* | 1/2005 | Bartels | H04L 63/0428 713/150 |
| 2006/0227773 | A1* | 10/2006 | Grewal | H04L 63/123 713/150 |
| 2007/0162957 | A1* | 7/2007 | Bartels | G05B 15/02 726/2 |
| 2008/0075079 | A1* | 3/2008 | Smith | H04L 47/10 370/392 |
| 2008/0109889 | A1* | 5/2008 | Bartels | H04L 63/0428 700/9 |
| 2011/0039237 | A1* | 2/2011 | Skare | H04L 63/14 434/118 |
| 2011/0055564 | A1* | 3/2011 | Porsch | H04L 9/3236 713/168 |
| 2011/0158405 | A1* | 6/2011 | Choi | H04L 9/0838 380/44 |
| 2012/0057702 | A1 | 3/2012 | Minematsu | |
| 2012/0093312 | A1* | 4/2012 | Gammel | H04L 9/12 380/255 |
| 2012/0096274 | A1* | 4/2012 | Campagna | H04L 9/3242 713/176 |
| 2012/0124384 | A1* | 5/2012 | Livni | H04L 63/126 713/178 |
| 2012/0284524 | A1* | 11/2012 | Ho | H04L 9/0637 713/181 |
| 2013/0080846 | A1* | 3/2013 | Premke | H04L 1/0011 714/704 |
| 2015/0026470 | A1 | 1/2015 | Livolsi et al. | |
| 2015/0215283 | A1* | 7/2015 | Fischer | H04L 63/0263 726/14 |
| 2018/0034785 | A1* | 2/2018 | Winkelvos | H04L 63/08 |
| 2018/0109427 | A1* | 4/2018 | Braband | H04L 63/12 |
| 2018/0124121 | A1* | 5/2018 | Blöcher | H04W 12/02 |
| 2018/0308302 | A1* | 10/2018 | Al-Yousef | H04N 23/20 |
| 2018/0367304 | A1* | 12/2018 | Morgenstern | H04L 65/70 |
| 2019/0014089 | A1* | 1/2019 | Wei | G06F 21/645 |
| 2019/0132119 | A1* | 5/2019 | Eckelmann-Wendt | H04L 63/105 |
| 2019/0351924 | A1* | 11/2019 | Bozzo | B61L 27/70 |
| 2019/0373460 | A1* | 12/2019 | Kilian | H04W 12/033 |
| 2021/0297245 | A1* | 9/2021 | Eckelmann-Wendt | G06F 21/71 |
| 2023/0339448 | A1* | 10/2023 | Tione | B60T 13/746 |
| 2024/0283658 | A1* | 8/2024 | Fukuoka | G06F 7/02 |

FOREIGN PATENT DOCUMENTS

| | | | | |
|---|---|---|---|---|
| DE | | 10011887 A1 | 9/2001 | |
| DE | 10 2016 205 126 A1 | | 10/2017 | |
| DE | 10 2016 215 520 A1 | | 2/2018 | |
| EP | | 2879008 A1 * | 6/2015 | ............ G05B 9/02 |
| JP | | 2005260358 A | 9/2005 | |

OTHER PUBLICATIONS

Jens Braband, What's Security Level got to do with Safety Integrity Level?, HAL Open Science, Mar. 2016.*
Nowakowski et al., Performance analysis of data security algorithms used in the railway traffic control systems, IEEE, 2017.*
Lewinski et al., Safety transmission in railway application—cryptographic approach, PSTT, vol. 6, Issue 3, Sep. 2013.*
Menezes A et al: "Hash functions and data integrity", Handbook of Applied Cryptography; CRC Press Series on Discrete Mathematices and Its Applications, Boca Raton, FL, US, pp. 321-383, XP001525009, ISBN: 978-0-8493-8523-0; gefunden im Internet: URL:http://www.cacr.math.uwaterloo.ca/hac/; 1996; Cryptographic hash functions play a fundamental role in modern cryptography. While related to conventional hash functions commonly used in non-cryptographic computer applications—in both cases, larger domains are mapped to smaller ranges—they differ in several important aspects. Our focus is restricted to cryptographic hash functions (hereafter, simply hash functions), and in particular to their use for data integrity and message authentication. Hash functions take a message as input and produce an output referred to as a hashcode, hash-result, hash-value, or simply hash. More precisely, a hash function h maps bitstrings of arbitrary finite length to strings of fixed length, say n bits. For a domain D and range R with h : D→R and |D| > |R|, the function is many-to-one, implying that the existence of collisions (pairs of inputs with identical output) is unavoidable. Indeed, restricting h to a domain of t-bit inputs (t>n), if h were "random" in the sense that all outputs were essentially equiprobable, then about 2t-n inputs would map to each output, and two randomly chosen inputs would yield the same output with probability 2-n (independent of t). The basic idea of cryptographic hash functions is that a hash-value serves as a compact representative image (sometimes called an imprint, digital fingerprint, or message digest) of an input string, and can be used as if it were uniquely identifiable with that string.
"EN 50129 Bahnanwendungen, Telekommunikationstechnik, Signaltechnik und Datenbearbeitungssysteme. Sicherheitsrelevante elektronische Systeme für Signaltechnik", Europaeische Norm—European Standard—Norme Europee, XX, XX, vol. EN 50129, pp. 1-98, XP009112742, the whole document; 2003; EN: Railway applications—Communication, signalling and processing systems—Safety related electronic systems for signalling; German version EN 50129:2018 + AC:2019 (European standard) (Translation of abstract): This European Standard is applicable to safety-related electronic systems (including subsystems and equipment) for railway signalling applications. This European Standard is intended to be applied to all safety-related railway signalling systems, subsystems and installations. However, for all railway signalling systems, subsystems and installations, hazard analysis and risk assessment processes, as defined in EN 50126 and in this standard, are necessary to identify the safety requirements. This European Standard is only applicable to the functional safety of systems. It is not applicable to other safety aspects, such as occupational medicine and occupational safety. This European Standard applies to the specification, design, construction, installation, acceptance, operation, maintenance and modification or extension of complete signalling systems and also to individual subsystems and devices within an overall system. This European Standard applies to generic subsystems and equipment (both application-independent and intended for a specific class of applications) and to application-specific systems/subsystems/equipment. This European Standard does not apply to existing

(56) References Cited

OTHER PUBLICATIONS systems/subsystems/devices (i.e. those already recognised before this Standard was produced). However, as far as reasonably practicable, this standard should be applied to modifications and extensions of such systems, subsystems and equipment. The responsible body is DKE/UK 351.3 "Railway Signalling Installations" of the DKE German Commission for Electrical, Electronic & Information Technologies in DIN and VDE.

"Norm DIN EN 50159—Bahnanwendungen—Telekommunikationstechnik, Signaltechnik und Datenverarbeitungssysteme—Sicherheitsrelevante Kommunikation in Übertragungssystemen; Deutsche Fassung EN 50159:2010"; 2011; EN: Railway applications—Communication, signalling and processing systems—Safety-related communication in transmission systems; German version EN 50159:2010 (Translation of abstract): This European Standard is applicable to security relevant electronic systems which use for digital communication purposes a transmission system which is not necessarily designed for security relevant applications and which—is under the control of the designer and remains unalterable during its life cycle, or—is partly unknown and also not unalterable, but where unauthorised access can be excluded, or—is not under the control of the designer and unauthorised access must also be taken into account. The UK 351.3 "Railway Signalling Systems" of the DKE German Commission for Electrical, Electronic & Information Technologies in DIN and VDE is responsible for this.

\* cited by examiner

METHOD AND ARRANGEMENT FOR THE SECURE TRANSMISSION OF A MESSAGE FROM A TRANSMITTER TO A RECEIVER

BACKGROUND OF THE INVENTION

Field of the Invention

The invention relates to a method for the secure transmission of a message from a transmitter to a receiver, in particular, a method which is suitable for use in rail automation or signaling and in rail vehicle technology. Such methods are described, for example, in the publications DE 10 2016 205 126 A1 and DE 100 11 887 A1 and in the safety standards EN 50129 and EN 50159.

SUMMARY OF THE INVENTION

The object underlying the invention is to specify a method offering a high level of transmission security.

This object is achieved according to the invention by a method with the features according to the independent method claim. Advantageous embodiments of the method are specified in subclaims.

According to the invention, it is then provided that a telegram generated by the transmitter and contains the message and the check data formed with the message, is transferred to a transmitter-side access protection device. The transmitter-side access protection device modifies the telegram by encrypting the check data as a whole or at least a part of the check data, which contains a security code formed with the message by the transmitter, using a secret key forming coded data and in the telegram the check data that has been encrypted is replaced by the coded data, the message remaining unencrypted in the telegram. The transmitter-side access protection device then transmits the modified telegram over a connection, in particular, a potentially insecure or potentially vulnerable transmission medium, to a receiver-side access protection device. The receiver-side access protection device processes the modified telegram and forwards the processed telegram to the receiver. The receiver-side access protection device forms the processed telegram by decrypting the coded data and replacing the coded data in the telegram with the decrypted coded data. The receiver verifies the processed telegram using the message contained therein and the check data contained therein and rejects the message if the check data does not correlate with the message.

A major advantage of the method according to the invention is that it can be performed on the basis of known transmitters and receivers without these having to be changed or modified for this purpose; with regard to the transmitter and the receivers, it is thus possible to resort to existing or proven products. Specifically, for example, transmitters and receivers which satisfy the safety standards EN 50129 and EN 50159 with the desired safety level can be used without jeopardizing their safety rating. Through the use according to the invention of the additional transmitter-side access protection device and the additional receiver-side access protection device, message transmission security is increased.

A further major advantage of the method according to the invention is that the actual message in the telegram remains unencrypted because only check data is encrypted, thus also enabling use of the method in countries in which encrypted message transmission is subject to strict legal constraints.

To prevent or at least impede access from outside or from the potentially insecure or potentially vulnerable transmission medium to the transmitter, it is regarded as advantageous if there is no logical connection between the transmitter and the transmitter-side access protection device and the transmitter-side access protection device is only suitable for receiving and modifying telegrams from the transmitter and outputting the modified telegrams.

To prevent or at least impede access from outside or from the potentially insecure or potentially vulnerable transmission medium to the receiver, it is regarded as advantageous if there is no logical connection between the receiver and the receiver-side access protection device and the receiver-side access protection device is only suitable for processing received telegrams and forwarding the processed telegrams.

With regard to the reliable detection of transmission errors or manipulations, it is regarded as advantageous if the transmitter-side access protection device adds additional check data before the encryption of the check data or of at least a part of the check data, and also encrypts this additional check data using the secret key when forming the coded data, and the receiver-side access protection device decrypts the coded data and, after decrypting the coded data, verifies the additional check data contained therein for correctness and then forwards the processed telegram to the receiver only if the additional check data indicates correct data transmission.

Alternatively or additionally—likewise with regard to the reliable detection of transmission errors or manipulations—it can be advantageously provided for that the transmitter-side access protection device generates further check data before or after the encryption of the check data or of at least a part of the check data, namely by encrypting a part of the unmodified telegram of the transmitter using a further secret key, and transmits the further check data as a part of the modified telegram to the receiver-side access protection device and the receiver-side access protection device verifies the further check data for correctness and then forwards the processed telegram to the receiver only if the further check data indicates correct data transmission.

In the latter variant, it can alternatively be provided that the transmitter-side access protection device generates the further check data by encrypting not only a part of the unmodified telegram of the transmitter, but the entire unmodified telegram of the transmitter with the further secret key.

In a particularly preferred variant, it is provided that the transmitter-side access protection device adds additional check data before the encryption of the check data or of at least a part of the check data and also encrypts this additional check data using the secret key when forming the coded data, the transmitter-side access protection device generates further check data before or after the formation of the coded data, namely by encrypting part of the unmodified telegram of the transmitter using a further secret key, and transmits the further check data to the receiver-side access protection device as part of the modified telegram, the receiver-side access protection device verifies the further check data for correctness, the receiver-side access protection device decrypts the coded data and verifies the additional check data for correctness and the receiver-side access protection device then forwards the processed telegram to the receiver only if both the further and the additional check data indicate correct data transmission. The sequence of the test steps described here is arbitrary.

In another particularly preferred variant, it is provided that the transmitter-side access protection device adds additional check data before the encryption of the check data or of at least a part of the check data and also encrypts this additional check data using the secret key when forming the coded data, the transmitter-side access protection device generates further check data before or after the formation of the coded data, namely by encrypting the entire unmodified telegram of the transmitter using a further secret key, and transmits the further check data to the receiver-side access protection device as part of the modified telegram, the receiver-side access protection device verifies the further check data for correctness, the receiver-side access protection device decrypts the coded data and verifies the additional check data for correctness and the receiver-side access protection device then forwards the processed telegram to the receiver only if both the further and the additional check data indicate correct data transmission. The sequence of the test steps described here is arbitrary.

The transmitter preferably forms the security code such that on the receiver side a change in the message contained in the telegram can be detected by evaluating the security code.

In addition to the security code, the check data generated by the transmitter preferably contains at least one of the following items of message-independent information: a sequence number of the telegram, a timestamp of the telegram, an identifier of the transmitter and/or an identifier of the receiver.

The transmitter and the receiver preferably each have a safety level of at least 1 in accordance with the safety standards EN 50129 and/or EN 50159.

The data connection between the transmitter and the transmitter-side access protection device is preferably access-protected and is considered secure in this regard.

The data connection between the receiver and the receiver-side access protection device is preferably access-protected and is considered secure in this regard.

The method is particularly advantageous in the field of rail automation or signaling and rail vehicle technology.

In a preferred railway-related embodiment of the method, it is provided that the message is transmitted from a vehicle-side or track-side device of a railway signaling system to another vehicle-side or track-side device of the railway signaling system, wherein the transmitter and the transmitter-side access protection device and the receiver and the receiver-side access protection device are accommodated in the vehicle-side or track-side devices.

The invention furthermore relates to an arrangement with a transmitter, a transmitter-side access protection device, a receiver-side access protection device and a receiver. According to the invention, with regard to this arrangement it is provided that the transmitter is designed to transmit a telegram generated by the transmitter, which comprises the message and check data formed with the message, to the transmitter-side access protection device, the transmitter-side access protection device is designed to modify the telegram by encrypting the check data as a whole or at least a part of the check data, which contains a security code formed with the message by the transmitter, using a secret key forming coded data and in the telegram the check data that has been encrypted is replaced by the coded data, wherein the message remains unencrypted in the telegram, and the transmitter-side access protection device is also designed to then transmit the modified telegram over a connection, in particular, a potentially insecure or potentially vulnerable transmission medium, to the receiver-side access protection device, the receiver-side access protection device is designed to process the modified telegram by decrypting the coded data and replacing the coded data in the telegram with the decrypted coded data, and to forward the processed telegram to the receiver and the receiver is designed to verify the processed telegram using the message contained therein and the check data contained therein and to reject the message if the check data does not correlate with the message.

With regard to the advantages of the arrangement, reference is made to the above embodiments in connection with the method according to the invention.

In a preferred embodiment of the arrangement, it is provided that the transmitter and the transmitter-side access protection device are accommodated in one vehicle-side or track-side device of a railway signaling system and the receiver and the receiver-side access protection device in another vehicle-side or track-side device of the railway signaling system.

The invention is described in more detail hereinafter with reference to exemplary embodiments. FIGS. 1 to 6 show by way of example exemplary embodiments for various arrangements according to the invention on the basis of which exemplary embodiments of the method according to the invention are described.

DETAILED DESCRIPTION OF THE INVENTION

Figure 1:
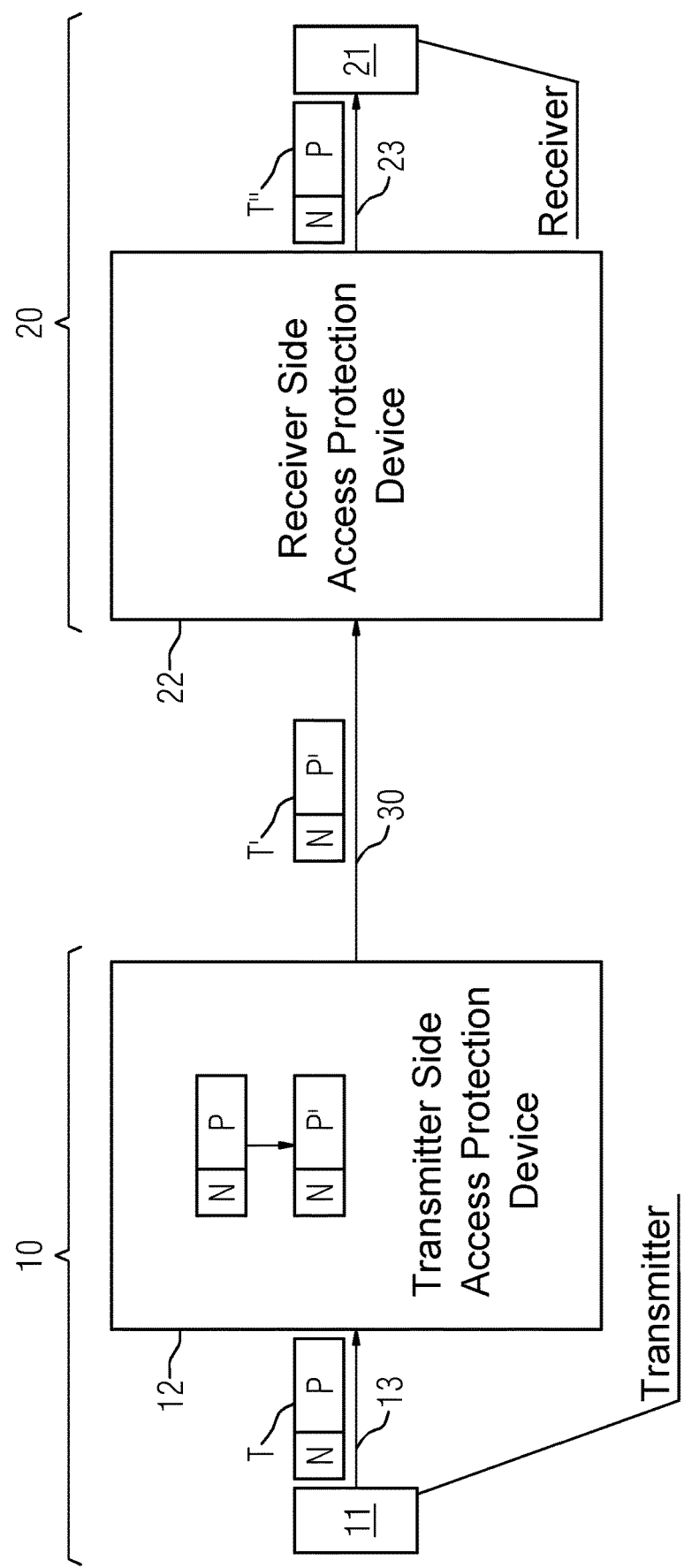
FIG. 1 shows an exemplary embodiment of an arrangement in which a transmitter-side access protection device encrypts the entire check data.

In the figures, for the sake of clarity the same reference characters are always used for identical or comparable components.

FIG. 1 shows an arrangement with a transmitter side 10, having a transmitter 11 and a transmitter-side access protection device 12. Furthermore, the arrangement comprises a receiver side 20, having a receiver 21 and a receiver-side access protection device 22.

Hereinafter, it is assumed by way of example that the connection 13 between the transmitter 11 and the transmitter-side access protection device 21 is secure or, at least with regard to manipulations, more secure than the connection 30 between the transmitter side 10 and the receiver side 20. It is also assumed by way of example that the connection 23 between the receiver-side access protection device 22 and the receiver 21 is secure or, at least with regard to manipulations, more secure than the connection 30 between the transmitter side 10 and the receiver side 20. The connection 30 can be formed by a potentially insecure or potentially vulnerable transmission medium, for example by a data network such as, for example the Internet.

The arrangement according to FIG. 1, for the transmission of a message N from the transmitter 11 to the receiver 21, for example, is operated as follows:

The transmitter 11 generates a telegram T which contains the message N and the check data P formed with the message. The check data P can, for example, contain test values and/or hash values, as is generally known, for example, from the aforementioned publications DE 10 2016 205 126 A1 and DE 100 11 887 A1 or the safety standards EN 50129 and EN 50159.

The check data P generated by the transmitter preferably contains a security code which makes it possible on the receiver side for a change in the message N contained in the telegram T to be detected by evaluating the security code. Furthermore, the check data P preferably contains a sequence number of the telegram T, a timestamp of the telegram T, an identifier of the transmitter 11 and an identifier of the receiver 21.

The telegram T is transmitted by the transmitter 11 to the transmitter-side access protection device 12. The transmitter-side access protection device 12 modifies the telegram T to form a modified telegram T' by encrypting the check data P as a whole using a secret key forming coded data P' and replacing the check data P in the telegram T with the coded data P'.

Then the transmitter-side access protection device 12 transmits the modified telegram T' over the connection 30 to the receiver-side access protection device 22. The receiver-side access protection device 22 processes the modified telegram T'. As part of processing, it decrypts the coded data P' using a, for example public, key complementary to the secret key of the transmitter-side access protection device 12 and forms a processed telegram T" by replacing the coded data P' with the decrypted coded data.

If the transmission of the telegram T' over the connection 30 was uninterrupted, the decoded or decrypted coded data correspond to the original check data P in the telegram T of the transmitter 11; this is assumed by way of example in the illustration in FIG. 1.

Then the receiver-side access protection device 22 forwards the processed telegram T" to the receiver 21. The receiver 21 verifies the processed telegram T" using the message N contained therein and the check data P contained therein and rejects the message N if the check data P does not correlate with the message N. If the message N and the check data P correlate or match in terms of content, the message N is evaluated.

The receiver 21 can check the processed telegram T", for example, by forming its own check data with the message N and comparing this with the check data P contained in the processed telegram T": if the self-formed check data corresponds to the check data P contained in the processed telegram T", the message is evaluated, otherwise it is rejected.

Figure 2:
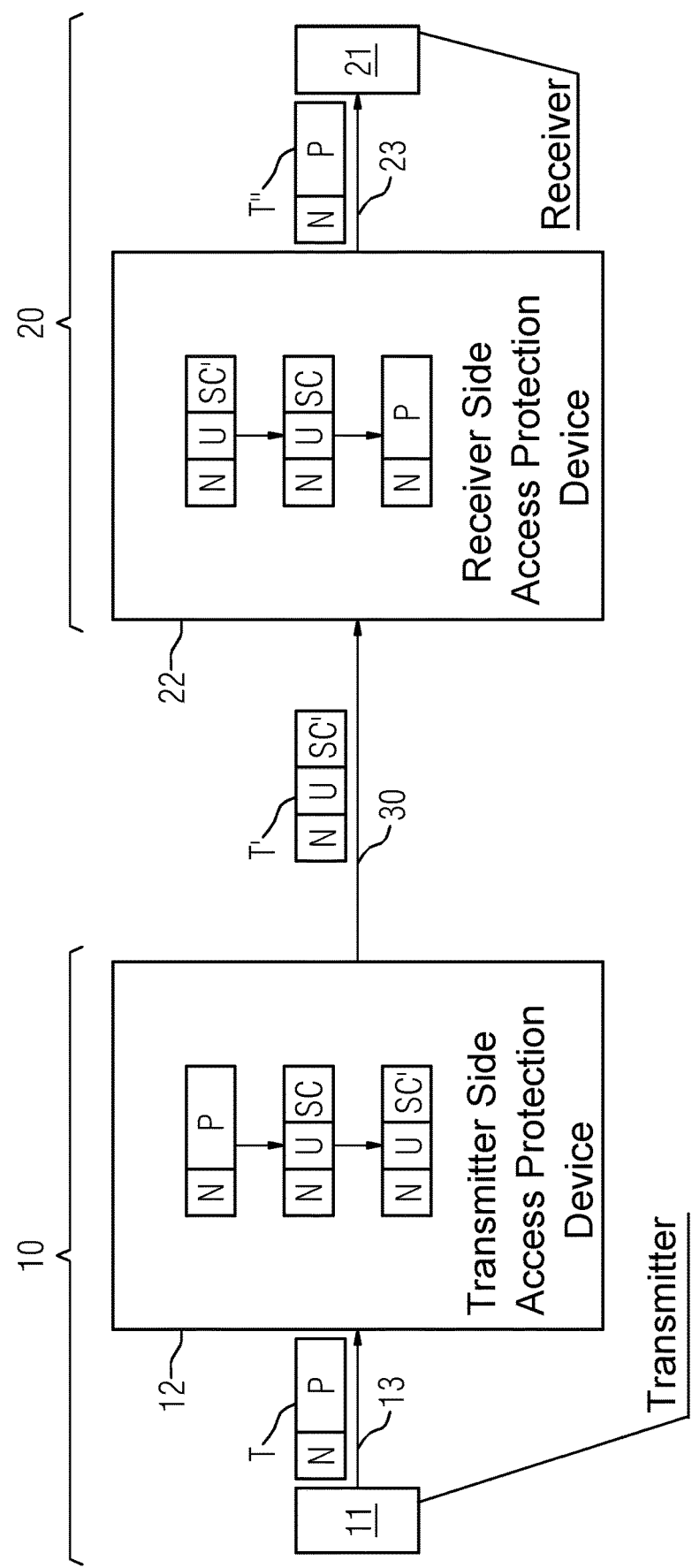
FIG. 2 shows an exemplary embodiment of an arrangement in which a transmitter-side access protection device only encrypts the security code in the check data of the telegram of the transmitter.

FIG. 2 shows an arrangement in which the transmitter-side access protection device 12 forms the modified T' by encrypting from the check data only one security code SC contained therein using the secret key forming coded data SC' and in the telegram T replacing the security code SC with the coded data SC'. The remaining check data U remains unchanged.

The receiver-side access protection device 22 decrypts the coded data SC', determines the security code SC and generates the processed telegram T" which is transmitted to the receiver 21; in this regard, the above statements apply accordingly in connection with FIG. 1.

Figure 3:
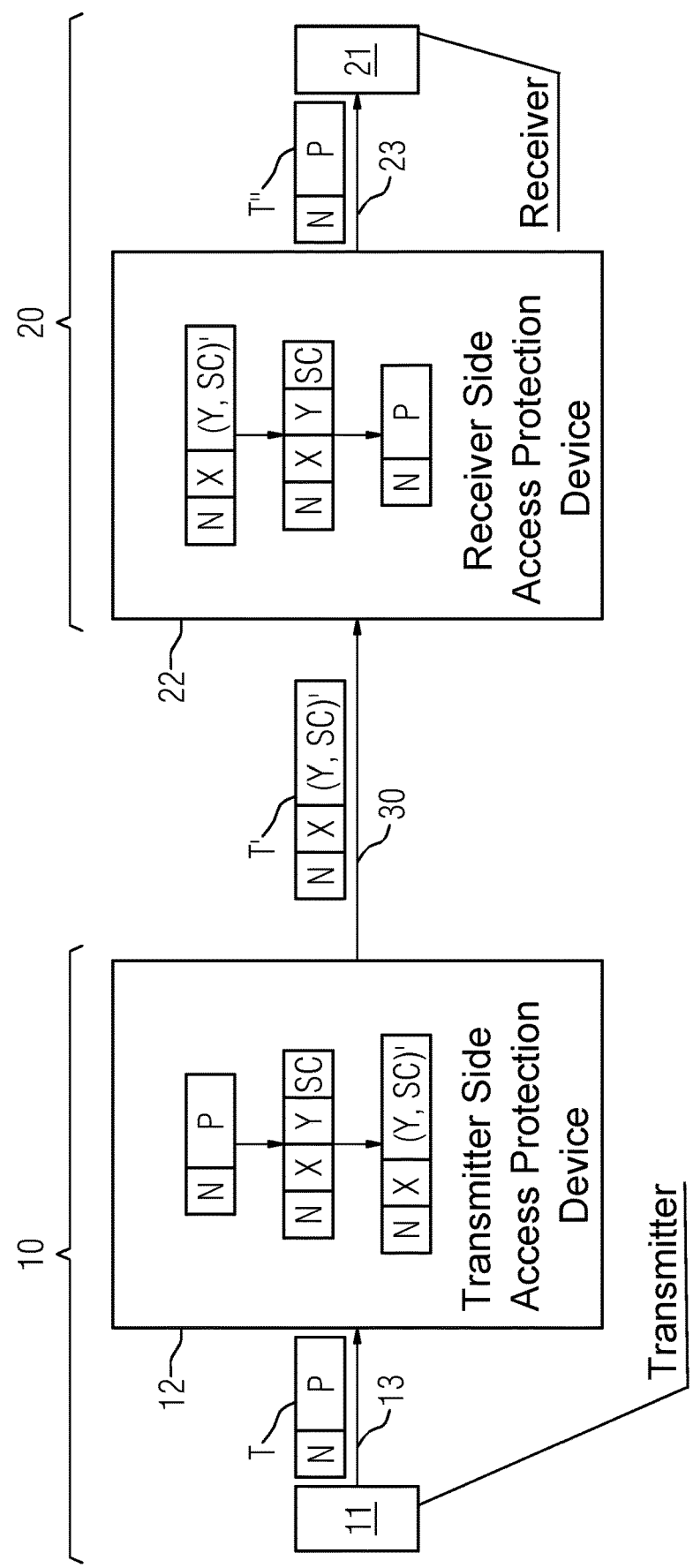
FIG. 3 shows an exemplary embodiment of an arrangement in which a transmitter-side access protection device encrypts the security code and a further part of the check data of the telegram of the transmitter.

FIG. 3 shows an arrangement in which the transmitter-side access protection device 12 forms the modified T' by encrypting from the check data the security code SC and a part Y without security code using the secret key forming coded data (Y,SC)', and in the telegram T replacing the latter with the coded data (Y,SC)'. The other part X of the check data remains unencrypted.

The receiver-side access protection device 22 decrypts the coded data (Y,SC)', determines the security code SC and the part Y of the check data P and generates the processed telegram T", which is transmitted to the receiver 21; in this regard, the above statements apply accordingly in connection with FIG. 1.

Figure 4:
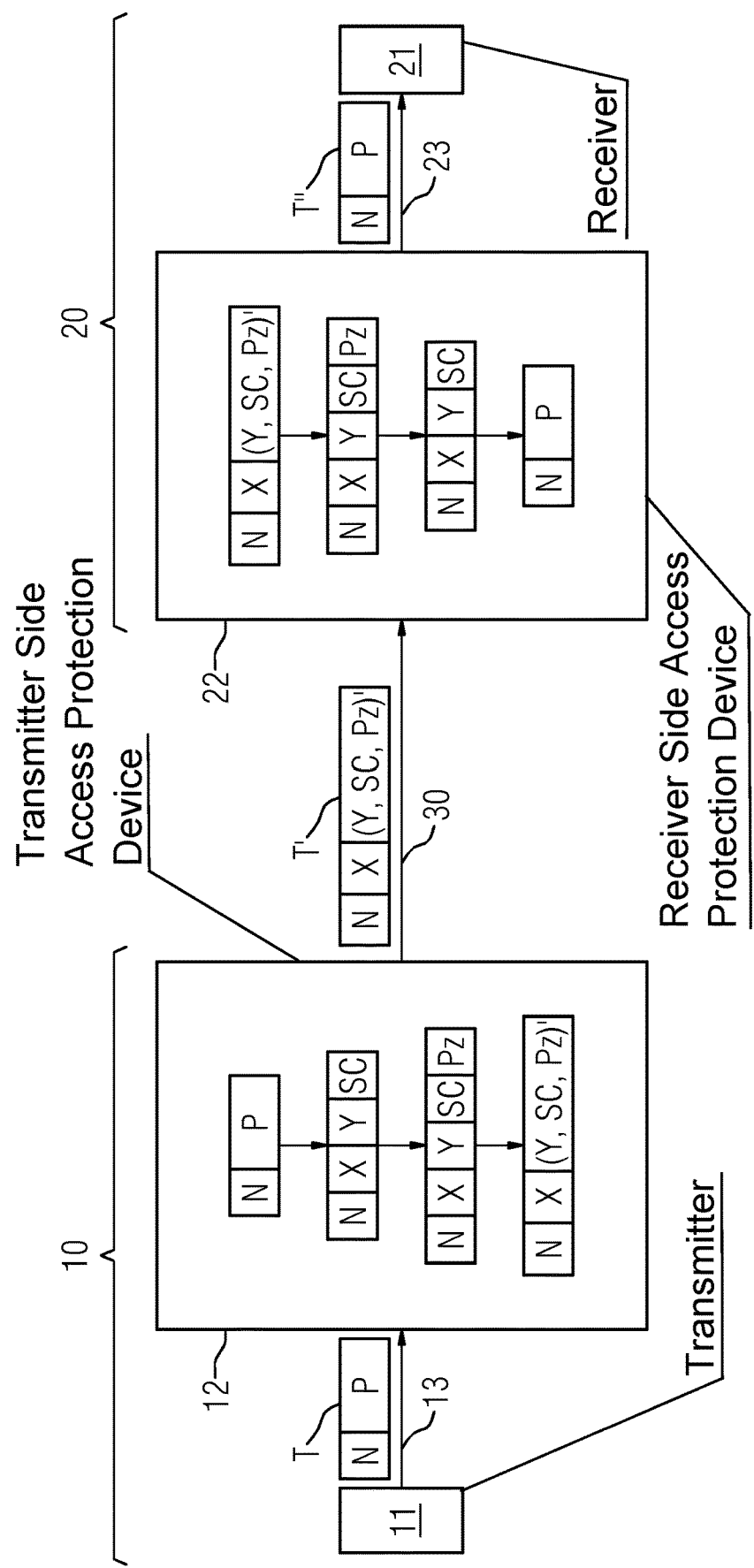
FIG. 4 shows an exemplary embodiment of an arrangement in which a transmitter-side access protection device encrypts the security code, a further part of the check data in the telegram of the transmitter and also added additional check data using a key.

FIG. 4 shows an arrangement in which the transmitter-side access protection device 12 forms the modified telegram T' by adding additional check data Pz before encrypting the part Y of the check data P and the security code SC and also encrypting this additional check data Pz using the secret key when forming the coded data (Y,SC,Pz)'.

The additional check data Pz can, for example, contain one or more hash values over the entire telegram T or parts of the telegram T.

The receiver-side access protection device 22 decrypts the coded data (Y,SC,Pz)'. After decryption of the coded data, it verifies the additional check data Pz contained therein for correctness and then forwards the processed telegram T" to the receiver 21 only if the additional check data Pz indicates correct data transmission.

Figure 5:
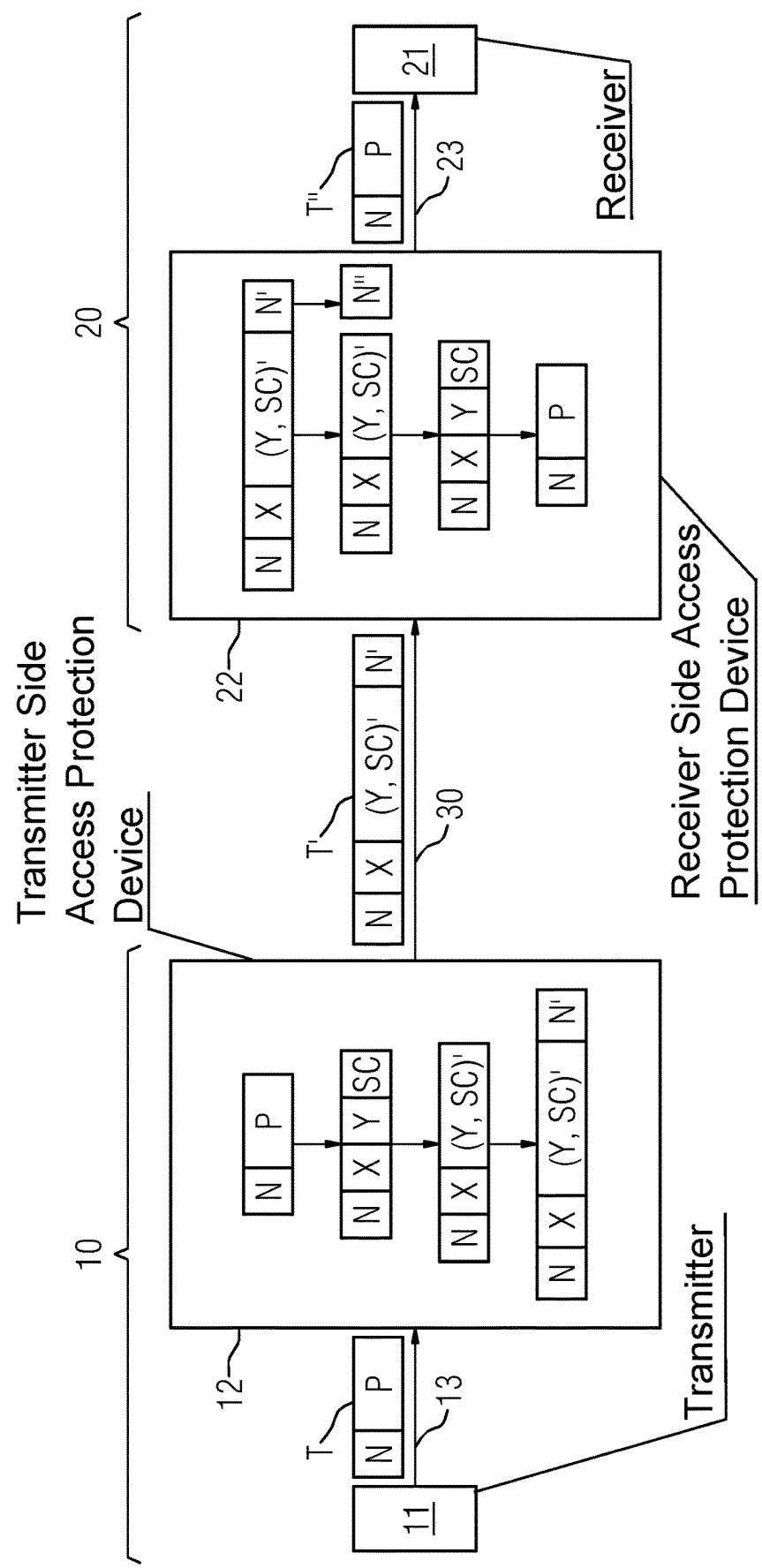
FIG. 5 shows an exemplary embodiment of an arrangement in which a transmitter-side access protection device encrypts the security code and a further part of the check data in the telegram of the transmitter with a first key forming coded data and even forms and adds further check data using a second key.

FIG. 5 shows an arrangement in which the transmitter-side access protection device 12 forms the modified T' by generating further check data N' before or after (based on a first key) encryption of the check data P or a part of the check data P, in other words, before or after the formation of the coded data P' (see FIG. 1), SC' (see FIG. 2) or—as shown by way of example in FIG. 5—(Y,SC)' (see FIG. 3), namely by encrypting the entire unmodified telegram T or a part of the unmodified telegram T, for example, by encrypting the message N in the telegram T, with a further (in other words, a second) secret key which is preferably different from the first key.

The further check data N' can, for example, contain one or more hash values over the entire telegram T or parts of the telegram T. The further check data N' can, for example, contain MAC (Message Authentication Code) values.

The receiver-side access protection device 22 verifies the further check data N' for correctness. Checking for correctness can be performed, for example, by the receiver-side access protection device 22—in a manner analogous to the transmitter-side access protection device 12 or, for example, in the same manner—forming its own further check data N' with the decrypted telegram T" or the corresponding parts of the decrypted telegram T". Then the receiver-side access protection device 22 compares its own further check data N' with the received further check data N'. If the self-formed further check data N' corresponds to the received further check data N', it is concluded that the transmission is correct. The processed telegram T" is then forwarded to the receiver 21 only if the further check data N' indicates correct data transmission.

Figure 6:
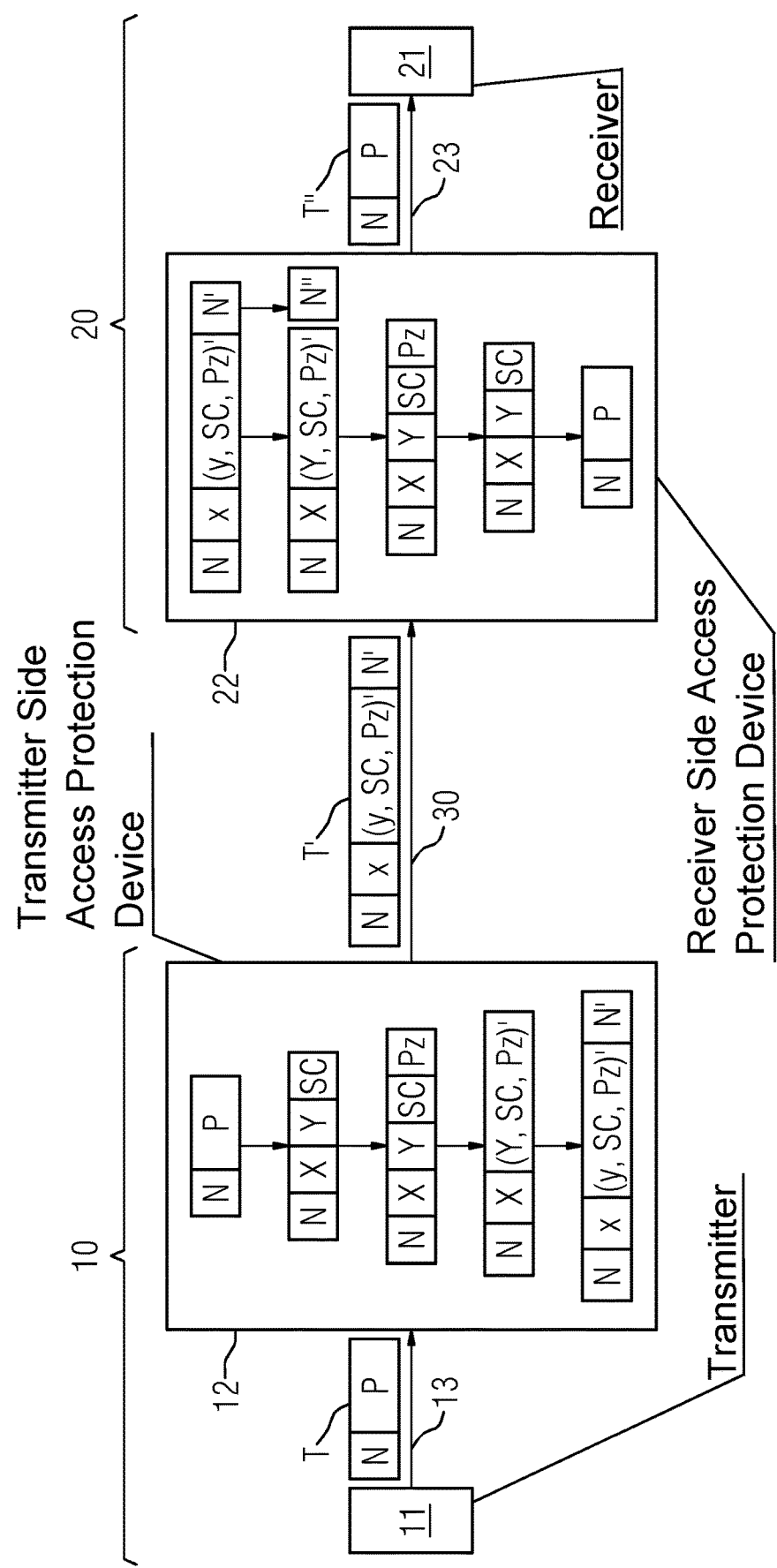
FIG. 6 shows an exemplary embodiment of an arrangement in which a transmitter-side access protection device encrypts the security code, a further part of the check data in the telegram of the transmitter and also added additional check data using a first key and forms and adds further check data using a second key.

FIG. 6 shows an arrangement in which the transmitter-side access protection device 12 forms the modified telegram T' by performing the steps both according to the embodiment variant according to FIG. 4 and according to the embodiment variant according to FIG. 5. Accordingly, before encrypting the check data P or at least a part of the check data P, the transmitter-side access protection device 12 adds additional check data Pz and encrypts this additional check data Pz when forming the coded data (Y,SC,PZ)' with a first secret key.

Before or after forming the coded data (Y,SC,PZ)', the transmitter-side access protection device 12 generates further check data N', namely by encrypting part of the unmodified telegram T of the transmitter or the entire unmodified telegram T of the transmitter with a further (second) secret key. The further check data N' is transmitted as part of the modified telegram T' to the receiver-side access protection device 22. The second secret key is preferably different from the first secret key with which the coded data (Y,SC,PZ)' is formed.

The receiver-side access protection device 22 decrypts the further check data N' and the coded data (Y,SC,Pz)' and verifies the further check data N" and the additional check data Pz for correctness.

The receiver-side access protection device 22 then forwards the processed or decrypted telegram T" to the receiver 21 only if both the decrypted further check data N" and the additional check data Pz indicate correct data transmission.

With a view to secure message transmission, it is regarded as advantageous if in the case of the exemplary embodiments according to FIGS. 1 to 6, the transmitter and the receiver each has a safety level of at least 1 in accordance with the safety standards EN 50129 and/or EN 50159.

The arrangements according to FIGS. 1 to 6 can be used advantageously to transmit messages from one vehicle-side or track-side device of a railway signaling system to another vehicle-side or track-side device of the railway signaling system. In this case, it is advantageous if the transmitter 11 and the transmitter-side access protection device 12 as well as the receiver 21 and the receiver-side access protection device 22 are accommodated in the vehicle-side or track-side devices.

Although the invention was illustrated and described in more detail by preferred exemplary embodiments, the invention is not limited by the disclosed examples and other variations can be derived therefrom by a person skilled in the art without departing from the scope of the invention.

The invention claimed is:

1. A method for transmitting a message from a transmitter to a receiver, the method comprising the steps of:
   transferring a telegram generated by the transmitter to a transmitter-side access protection device, the telegram containing the message and check data formed with the message, the check data including a security code formed with the message by the transmitter;
   modifying the telegram via the transmitter-side access protection device, the transmitter-side access protection device modifying the telegram by encrypting the check data as a whole or at least a part of the check data containing the security code, the transmitter-side access protection device using a secret key for forming coded data, and in the telegram the coded data replaces the check data which has been encrypted by the coded data resulting in a modified telegram in which the check data is encrypted and the message remains unencrypted in the modified telegram;
   transmitting the modified telegram over a connection being potentially insecure or a potentially vulnerable transmission medium, to a receiver-side access protection device;
   processing, via the receiver-side access protection device, the modified telegram and forwarding a processed telegram to the receiver, wherein the receiver-side access protection device forms the processed telegram by decrypting the coded data using a key complementary to the secret key and replacing the coded data in the modified telegram with decrypted coded data;
   verifying, via the receiver, the processed telegram on a basis of the message contained therein and the check data contained therein, the receiver forming its own check data with the message and comparing the receiver formed check data with the check data contained in the processed telegram; and
   rejecting the message, via the receiver, if the receiver formed check data does not correlate with the check data contained in the processed telegram.

2. The method according to claim 1, wherein:
   before an encryption of the check data or at least the part of the check data, the transmitter-side access protection device adds additional check data and also encrypts the additional check data using the secret key when forming the coded data; and
   the receiver-side access protection device decrypts the coded data and after decrypting the coded data, verifies the additional check data contained therein for correctness and forwards the processed telegram to the receiver only if the additional check data indicates correct data transmission.

3. The method according to claim 1, wherein:
   before or after the encrypting of the check data or at least the part of the check data, the transmitter-side access protection device generates further check data, namely by encrypting part of the telegram being an unmodified telegram of the transmitter using a further secret key, and transmits the further check data as part of the modified telegram to the receiver-side access protection device; and
   the receiver-side access protection device verifies the further check data for correctness and forwards the processed telegram to the receiver only if the further check data indicates correct data transmission.

4. The method according to claim 1, wherein before or after encrypting the check data or at least the part of the check data, the transmitter-side access protection device generates further check data, namely by encrypting an entire unmodified telegram of the transmitter using a further secret key, and transmits the further check data as part of the modified telegram to the receiver-side access protection device and the receiver-side access protection device verifies the further check data for correctness and forwards the processed telegram to the receiver only if the further check data indicates correct data transmission.

5. The method according to claim 1, wherein:
   before encrypting the check data or at least a part of the check data, the transmitter-side access protection device adds additional check data and also encrypts the additional check data using the secret key when forming the coded data;
   before or after forming the coded data, the transmitter-side access protection device generates further check data, namely by encrypting part of the telegram being an unmodified telegram of the transmitter using a further secret key, and transmits the further check data as part of the modified telegram to the receiver-side access protection device;

the receiver-side access protection device verifies the further check data for correctness; and the receiver-side access protection device decrypts the coded data and verifies the additional check data for correctness and the receiver-side access protection device forwards the processed telegram to the receiver only if both the further check data and the additional check data indicate correct data transmission.

6. The method according to claim 1, wherein:

before encrypting the check data or at least the part of the check data, the transmitter-side access protection device adds additional check data and also encrypts the additional check data using the secret key when forming the coded data;

before or after forming the coded data the transmitter-side access protection device generates further check data, namely by encrypting an entire unmodified telegram of the transmitter using a further secret key, and forwards the further check data as part of the modified telegram to the receiver-side access protection device;

the receiver-side access protection device verifies the further check data for correctness; and the receiver-side access protection device decrypts the coded data and verifies the additional check data for correctness and the receiver-side access protection device forwards the processed telegram to the receiver only if both the further check data and the additional check data indicate correct data transmission.

7. The method according to claim 1, wherein the transmitter forms the security code such that a change in the message contained in the telegram can be identified on a receiver side by evaluating the security code.

8. The method according to claim 1, wherein in addition to the security code, the check data generated by the transmitter contains at least one of the following items of message-independent information:
- a sequence number of the telegram;
- a timestamp of the telegram;
- an identifier of the transmitter; and
- an identifier of the receiver.

9. The method according to claim 1, wherein the transmitter and the receiver each have a safety level of at least 1 in accordance with safety standards EN 50129 and/or EN 50159.

10. The method according to claim 1, wherein a data connection between the transmitter and the transmitter-side access protection device is access-protected and is considered safe and a data connection between the receiver and the receiver-side access protection device is access-protected and is considered safe.

11. The method according to claim 1, wherein there is no logical connection between the transmitter and the transmitter-side access protection device and the transmitter-side access protection device is only suitable for receiving telegrams from the transmitter, modifying the telegrams and outputting modified telegrams.

12. The method according to claim 1, wherein there is no logical connection between the receiver and the receiver-side access protection device and the receiver-side access protection device is only suitable for processing received telegrams and outputting processed telegrams.

13. The method according to claim 1, which further comprises:

transmitting the message by one vehicle-side or track-side device of a railway signaling system to another vehicle-side or track-side device of the railway signaling system; and accommodating the transmitter and the transmitter-side access protection device as well as the receiver and the receiver-side access protection device in the vehicle-side or track-side device.

14. A system, comprising:
a transmitter-side access protection device;
a receiver-side access protection device;
a receiver;
a transmitter configured to transmit a telegram generated by said transmitter to said transmitter-side access protection device, the telegram containing a message and check data is formed with the message, said check data including a security code formed with said message by said transmitter;

said transmitter-side access protection device configured to modify the telegram by encrypting all the check data or at least a part of the check data which contains the security code, using a secret key for forming coded data and, in the telegram, replacing the check data which has been encrypted with the coded data resulting in a modified telegram in which the check data is encrypted and the message remains unencrypted in the modified telegram;

said transmitter-side access protection device is furthermore configured to then transmit the modified telegram over a connection being a potentially insecure or potentially vulnerable transmission medium, to said receiver-side access protection device;

said receiver-side access protection device configured to process the modified telegram by decrypting the coded data using a key complementary to the secret key and replacing the coded data in the modified telegram with the decrypted coded data resulting in a processed telegram, and forwarding the processed telegram to said receiver;

said receiver is configured to check the processed telegram using the message contained therein and the check data contained therein by forming its own check data with the message and comparing the receiver formed check data with the check data contained in the processed telegram; and said receiver additionally configured to reject the message if the receiver formed check data does not correlate with the check data contained in the processed telegram.

* * * * *